US005100604A

United States Patent [19]

Yamashita et al.

[11] Patent Number: 5,100,604

[45] Date of Patent: Mar. 31, 1992

[54] METHOD FOR MAKING A RESIN-BONDED MAGNET COMPRISING A FERROMAGNETIC MATERIAL AND A RESIN COMPOSITION

[75] Inventors: Fumitoshi Yamashita, Ikoma; Shuichi Kitayama; Masami Wada, both of Osaka, all of Japan

[73] Assignee: Matsushita Electric Industrial Co., Ltd., Japan

[21] Appl. No.: 632,654

[22] Filed: Dec. 26, 1990

Related U.S. Application Data

[63] Continuation of Ser. No. 152,415, Feb. 4, 1988, abandoned.

[30] Foreign Application Priority Data

Feb. 6, 1987 [JP] Japan ................................ 62-26671

[51] Int. Cl.$^5$ ............................................ B29C 43/00

[52] U.S. Cl. .................................... 264/115; 264/109; 419/35

[58] Field of Search ........................ 264/109, 115, 118; 419/35, 64

[56] References Cited

U.S. PATENT DOCUMENTS

| | | | |
|---|---|---|---|
| 3,108,074 | 10/1963 | Brownlow | 264/109 |
| 3,178,369 | 4/1965 | Simpkiss | 264/109 |
| 3,189,667 | 6/1965 | Buttner et al. | 264/109 |
| 4,063,970 | 12/1977 | Steingroever | 264/115 |
| 4,376,726 | 3/1983 | Sakaira et al. | 264/118 |
| 4,405,684 | 9/1983 | Blumentritt et al. | 428/418 |
| 4,567,096 | 1/1986 | Piltingsrud et al. | 428/423.9 |
| 4,689,163 | 8/1987 | Yamashita et al. | 252/62.54 |
| 4,710,239 | 12/1987 | Lee et al. | 148/101 |
| 4,714,124 | 12/1987 | Laib | 180/168 |
| 4,766,183 | 8/1988 | Rizk et al. | 525/415 |
| 4,931,092 | 6/1990 | Cisar et al. | 419/35 |
| 4,960,469 | 10/1990 | Tanigawa et al. | 419/35 |

FOREIGN PATENT DOCUMENTS

| | | |
|---|---|---|
| 0155082 | 9/1985 | European Pat. Off. . |
| 57-170501 | 10/1982 | Japan . |

OTHER PUBLICATIONS

Kunststoff-Taschenbuch, 22nd edition, Carl-Hanser Verlag, Munich 1983, pp. 379-388.

*Primary Examiner*—Robert A. Dawson
*Assistant Examiner*—Allan R. Kuhns
*Attorney, Agent, or Firm*—Lowe, Price, LeBlanc & Becker

[57] ABSTRACT

A method for making a resin-bonded magnet of flaky pieces of a ferromagnetic alloy and a resin composition which comprises providing composite granules obtained from a mixture of magnetically isotropic pieces of an Fe-B-R alloy, in which R is Nd and/or Pr, in the form of fine pieces and a resin composition comprised of at least one film-forming polymer having a functional group reactive with isocyanate groups and a blocked isocyanate. The granules are compression molded to obtain a green compact and subsequently thermally treated to allow reaction between the at least one film-forming polymer and the isocyanate by dissociation of the blocking groups by heating, thereby obtaining a resin-bonded magnet.

12 Claims, 6 Drawing Sheets

METHOD FOR MAKING A RESIN-BONDED MAGNET COMPRISING A FERROMAGNETIC MATERIAL AND A RESIN COMPOSITION

This application is a continuation application of application Ser. No. 07/152,415, filed Feb. 4, 1988 now abandoned.

BACKGROUND OF THE INVENTION

1. Field of the Invention

This invention relates to resin-bonded magnets which are one of the main members of permanent magnet motors widely used for controlling or driving, for example, peripheral equipment of computers, printers and the like. More particularly, the invention relates to a method for making such resin-bonded magnets which are comprised of ferromagnetic Fe-B-R alloys, in which R is Nd and/or Pr, and a resin composition. The resin-bonded magnet of the type to which the present invention is directed is described, for example, in U.S. Pat. No. 4,689,163.

2. Description of the Prior Art

As is known from and described in the above United States Patent, sintered ring or cylinder magnets of rare earth metal and cobalt alloys including, for example, Sm(Co, Cu, Fe, M)n, in which M is one or more elements of groups IV, V, VI and VII of the periodic table, and n is an integer of from 5 to 9, are very difficult in rendering them magnetically anisotropic along the radial direction of the ring. The main reason for this is considered due to the fact that the ring suffers a difference in expansion coefficient, based on the anisotropy, during the sintering process. Although the difference in the expansion coefficient is, more or less, influenced by the degree of magnetic anisotropy and the shape of the ring or cylinder, this generally has to be overcome by rendering the ring isotropic. This involves a disadvantage in that while the magnetic performance intrinsically reaches 20 to 30 MGOe in terms of maximum energy product, it lowers to about 5 MGOe along the radial direction of the ring or cylinder. Generally, the sintered magnet is mechanically brittle, so that part of the magnet is liable to come off and fly, with the fear that when such a magnet is applied to a permanent motor, a serious problem would occur with respect to the maintenance of their performance and reliability.

Resin-bonded ring magnets using rare earth metal and cobalt alloys can be made radially and magnetically anisotropic. This is because the difference in expansion coefficient between rare earth metals and cobalt is absorbed with the resin matrix. It is known that the resin-bonded magnet obtained by an injection molding has a maximum energy product of about 8 to 10 MGOe when rendered magnetically anisotropic along the axial direction. The resin-bonded magnet has a number of advantages: it has a density lower by approximately 30% than sintered magnets; the magnet can be designed to have a high dimensional accuracy; and because of the use of a resin, flexibility is imparted. Thus, it has generally been accepted that a resin-bonded ring magnet of Sm(Co, Cu, Fe, M)n undergoing radial magnetic anisotropy has well-balanced economy and performance as compared with sintered counterparts.

For the impartment of radial magnetic anisotropy to a resin-bonded magnet of a ring or cylindrical form, it is usual to generate a radial magnetic field in a cylindrical cavity accomodating the magnet. The radial magnetic field generator may be a generator which includes magnetic yokes and non-magnetic yokes arranged alternately to surround a mold, and a magnetizing coil provided outside the yokes as described, for example, in Japanese Laid-open Patent Application No. 57-170501, or a mold having a magnetizing coil embedded along the cavity. In order to cause a predetermined intensity of magnetic field to generate in the cavity, a high voltage, low current power supply is ordinarily used with a magnetomotive force being great. However, a magnetic path has to be so long as to cause a magnetic flux, produced by energization of the yokes with the magnetizing coil from the outer surface of the mold, to be effectively focussed within the cavity. Especially, with a small-sized cavity, a substantial amount of the magnetomotive force is lost or consumed as a leakage flux. Accordingly, it becomes difficult to make a resin-bonded magnet having a sufficiently radially magnetic anisotropy.

When used as a ring or cylinder magnet of radially magnetic anisotropy, a rare earth metal and cobalt alloy resin-bonded magnet may develop better magnetic characteristics than sintered ring or cylinder magnets. However, the magnetic characteristics of the resin-bonded magnet is greatly influenced by the shape of the magnet. This is a substantial and serious disadvantage when there is a strong demand for a small-sized and light weight resin-bonded magnet.

SUMMARY OF THE INVENTION

It is an object of the invention to provide a method for making a resin-bonded magnet in which the dimension or shape of the magnet and the direction of magnetization can be arbitrarily changed as will be different from the known rare earth metal and cobalt alloy resin-bonded magnet of a ring or cylindrical form.

It is another object of the invention to provide a method for making a resin-bonded magnet which is comprised of magnetically isotropic, melt-quenched ferromagnetic flaky pieces and a resin composition with a uniform distribution of density throughout the magnet.

It is a further object of the invention to provide a method for making a resin-bonded magnet having a skin layer on the surface thereof with attendant good corrosion preventive properties.

It is a still further object of the invention to provide a method for making a resin-bonded magnet which has a very high dimensional accuracy and is high in magnetic performance and quality.

According to the present invention, there is provided a method for making a resin-bonded magnet which comprises providing composite granules obtained from a mixture of magnetically isotropic, fine pieces of a melt-quenched Fe-B-R intermetallic compound or alloy, in which R is Nd and/or Pr, and a resin composition comprising at least one film-forming polymer having a functional group reactive with an isocyanate group and a blocked isocyanate, compressing the composite granules to obtain a green compact of a desired form, and heating the green compact at temperatures sufficient to melt the resin composition and to allow reaction between the at least one film-forming polymer and an isocyanate formed by dissociation of blocking groups of the blocked isocyanate, thereby obtaining a resin-bonded magnet. The fine pieces of the alloys are preferably in the form of flakes having a thickness not less than 15 micrometers.

DETAILED DESCRIPTION AND EMBODIMENTS OF THE INVENTION

Figure 1A:
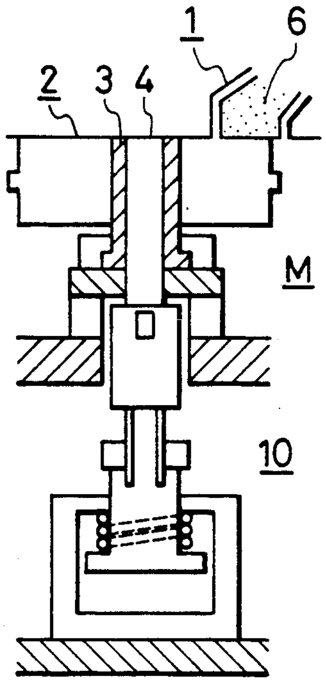
FIGS. 1*a* through 1*d* are schematic sectional views illustrating a compression molding procedure for green compact.
Figure 1B:
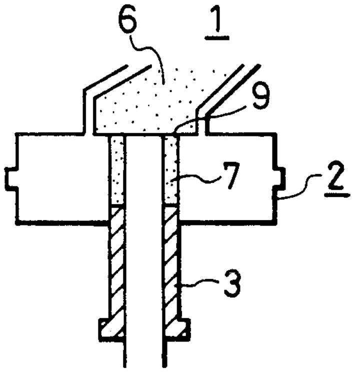

In the first step of the method according to the invention, there are provided composite granules of a mixture of fine pieces of a melt-quenched Fe-B-R intermetallic compound or alloy, in which R is Nd and/or Pr, and a resin composition. The resin composition comprises at least one film-forming polymer having a functional group reactive with an isocyanate group, and a blocked isocyanate.

The melt-quenched Fe-B-R alloys or intermetallic compounds used in the present invention, in which R represents Nd and/or P, have a fundamental composition of the formula, $R_{1-x}(Fe_{1-y}, B_y)$ in which $0.5 \leqq X \leqq 0.9$ and $0.05 \leqq y \leqq 0.10$. These alloys are readily obtained by homogeneously alloying a mixture of the respective elements in suitable proportions. Starting materials for the alloying are, for example, ferro-R, ferro-B and Fe. In practice, the alloy is used in the form of flaky pieces or flakes. For the formation of the flakes, an alloy melt is passed through an orifice in an atmosphere of an inert gas such as Ar and dropped between cooled rolls, whereupon the alloy melt is quenched to obtain a rapidly quenched ribbon having a thickness of several to several tens micrometers, preferably not less than 15 micrometers, most preferably from 15 to 30 micrometers. The ribbon is subsequently broken into pieces to such an extent that the pieces have a size of several to several hundred micrometers. Thus, the pieces are in the form of flakes. These flaky pieces sporadically have very fine ternary alloy magnet phases having a size of approximately 0.4 micrometers, so that they are magnetically isotropic in nature. The melt-quenched Fe-B-R alloy may be formed with such ternary alloy magnet phases either by a process in which the quenched alloy is obtained as amorphous and subsequently heated to a temperature higher than a crystallization temperature of the alloy thereby causing the magnet phases to be formed or precipitated, or by a process in which the final magnet phase microstructure is formed directly at the time of the melt quenching. The melt-quenched Fe-B-R alloy may comprise other elements such as Al, Si, Mo, Co, Pd, Zr, Y, Tb and the like as inevitable elements or as a substitute for part of Fe, but these elements should be suppressed in amounts not impeding the characteristic properties of the melt-quenched Fe-B-R alloy.

The pieces of the melt-quenched alloy used in the present invention may individually have a surface coating of a monomolecular or polymolecular layer of a material such as, for example, a carbon functional silane. Examples of the silane include r-glycidoxypropyltriethoxysilane, γ-aminopropyltrimethoxysilane, N-β-(aminoethyl)-γ-aminopropyltrimethoxysilane, γ-mercaptopropyltrimethoxysilane and the like.

The resin composition used in the present invention should comprise at least one film-forming polymer having in the molecule a functional group reactive with isocyanate groups, and a blocked isocyanate. The composition may further comprise a polymer which is not reactive with isocyanate groups and/or a thermosetting resin including a thermosetting oligomer which has a functional group reactive with an isocyanate group with little film-forming properties. The functional group reactive with isocyanate groups is, for example, —OH, —COOH, —NHCO—, —NHCOO—, —NHCONH—, $—NH_2$, $—NHNH_2$, —SH, —CHS, —CSOH, or active methylene. Of these, —OH, —NHCO—, —NHCOO— and NHCONH— are preferred. The film-forming polymers having these functional groups include, for example, polyethers, polyether esters, polyester imides, polyacetals, and the like having alcoholic hydroxyl groups, polyesters, amidoimide resins, polyamides, polyamide imides, polyurethanes, and mixtures thereof.

Typical and preferable examples of these polymers are described.

The polyethers are those polymers obtained from bisphenols and epichlorohydrin or substituted epichlorohydrin and having recurring units represented by the following general formula (1)

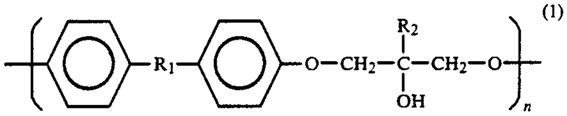

(1)

in which $R_1$ represents —O—, —S—, —SO—, $—SO_2—$, or $—C_pH_{2p}$, wherein p is an integer, such as $—CH_2—$, $—CH_2CH_2—$, $—C(CH_3)_2$ or the like, $R_2$ is —H, or $C_qH_{2q+1}$, wherein q is an integer, such as $—CH_3$, $—C_2H_5$ or the like, and n is an integer of from about 80 to about 120. These polyethers may further comprise other copolymerizable monomer units, if desired.

Examples of the polyether esters having a functional group reactive with an isocyanate group are those polymers having recurring units of the following general formula (2)

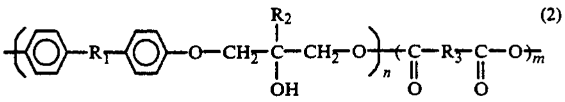

(2)

in which $R_1$ and $R_2$ have, respectively, the same meanings as defined with respect to the polyester, $R_3$ represents

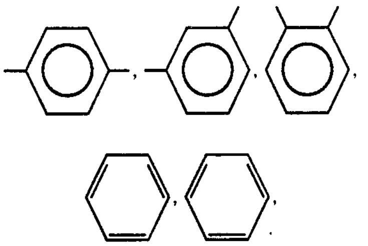

or $-CH_2-CH_2-$, and m is an integer of from about 80 to about 120.

The polyacetals include, for example, polyvinyl formal, polyvinyl butyral and the like.

The polyamides include homopolyamides obtained from lactams or aminocarboxylic acids, or also from diamines and dicarboxylic acids or their esters or halides. These polyamides are represented by the following general formulae (3) and (4)

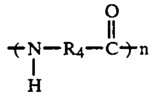

(3)

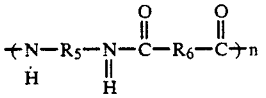

(4)

in which $R_4$, $R_5$ and $R_6$ are, respectively, a polymethylene group. When $R_4$ is $-(CH_2)_m-$, the product is called nylon (m+1). When $R_5$ is $-(CH_2)_p$ and $R_6$ is $-(CH_2)_{q-2}-$, the resultant product is called nylon-p.q. These polyamides may further comprise other copolymerizable monomer units such as ethylene.

The polyesters having a functional group or groups reactive with isocyanate groups may be those polyesters having hydroxyl group at ends or in the chains of the molecule and include polyethylene terephthalates, polybutylene terephthalates and the like which are obtained by reaction between aromatic dibasic acids or esters or halides thereof and fatty divalent alcohols. Moreover, poly-1,4-cyclohexylene terephthalate in which an alicyclic ring structure is incorporated in the divalent alcohol is also used. Of course, another copolymerizable monomer may be used for modification.

The blocked isocyanates are polyisocyanates whose isocyanate groups are substantially wholly stabilized with compounds having an alcoholic hydroxyl group or groups, or stabilized with compounds having a group capable of stabilizing the isocyanate group but other than an alcoholic hydroxyl group. That is, the stabilized polyisocyanates are obtained by reaction between polyisocyanates and alcoholic hydroxyl group-bearing compounds. Examples of the polyisocyanates include diisocyanates such as 2,4-tolylene diisocyanate, 2,6-tolylene diisocyanate, cyclopentylene diisocyanate, m-phenylene diisocyanate, p-phenylene diisocyanate, ethylene diisocyanate, butylidene diisocyanate, 1,5-naphthalene diisocyanate, 1,6-hexamethylene diisocyanate, 4,4'-diphenylmethane diisocyanate, 4,4'-diphenyl ether diisocyanate, xylylene diisocyanate and the like. Examples of tri or higher isocyanates include a cyclic trimer of 2,4-tolylene diisocyanate, a cyclic trimer of 2,6-tolylene diisocyanate, a trimer of 4,4'-diphenylmethane diisocyanate, trimers of trifunctional isocyanates of the following formula (5)

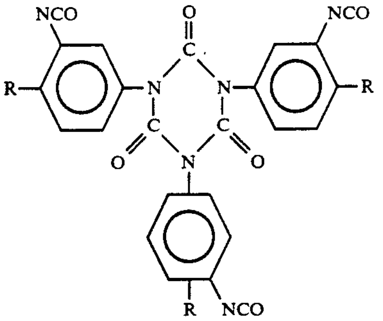

(5)

in which each R represents a lower alkyl group such as a methyl group, an ethyl group, an n-propyl group, an isopropyl group, an n-butyl group or the like. There are also mentioned 1,3,5-triisocyanate benzene, 2,4,6-triisocyanate toluene, reaction products of diisocyanates and polyhydric alcohols used in amounts sufficient to react with not less than the half the isocyanate groups of the diisocyanate, and products obtained by 3 moles of hexamethylene diisocyanate and 1 mole of water.

The compounds having an alcoholic hydroxyl group or groups include aliphatic alcohols such as methyl alcohol, ethyl alcohol, n-propyl alcohol, iso-propyl alcohol, n-butyl alcohol and the like, alicyclic alcohols such as cyclohexyl alcohol, 2-methylcyclohexyl alcohol and the like, and monohydric alcohols such as benzyl alcohol, phenyl cellosolve, furfuryl alcohol and the like. In addition, polyhydric alcohol derivatives such as ethylene glycol monoethyl ether, ethylene glycol isopropyl ether, ethylene glycol monobutyl ether and the like may be mentioned.

Compounds other than the above alcoholic hydroxyl group-bearing compounds used to stabilize the isocyanate groups include phenols and active methylene group-containing compounds. Examples of the phenols include phenol, cresol, xylenol, p-ethylphenol, o-isopropylphenol, p-t-butylphenol, p-t-octylphenol, p-catechol, resorcinol and the like. Examples of the active methylene group-containing compounds include dimethyl malonate, diethyl malonate, methyl acetoacetate, ethyl acetoacetate and the like.

The polymers which do not react with the isocyanate group are, for example, polysulfones, polycarbonates, polyphenylene sulfides, polymethane phenoxines and the like.

Further, thermosetting resins or oligomers, which have poor or little film forming properties but have a functional group reactive with isocyanates may be added in order to impart mechanical strength to a final magnet. Examples of the resins including oligomers include epoxy resins, melamine resins, benzoguanamine resins, xylene resins, mixtures thereof. As mentioned above, the resins are intended to include oligomers which are cured by reaction with isocyanates.

The epoxy resins having a functional group reactive with an isocyanate are those which are obtained by reaction between bisphenols and epichlorohydrin or substituted epichlorohydrins, or which are obtained by other methods. Typical examples of the epoxy resin are those of the following general formula (6)

(6)

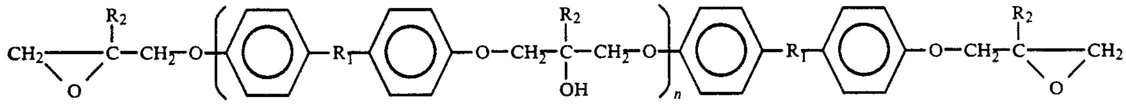

in which $R_1$ and $R_2$ have, respectively, the same meanings as defined before and n' is an integer of from 0 to 10.

The phenolic resins are, for example, those products which are obtained by reaction between compounds having a phenolic hydroxyl group such as, for example, phenol, cresol, xylenol, p-t-butylphenol, dihydroxyphenylmethane, bisphenol A or the like and compounds having an aldehyde group, e.g. formaldehyde and furfural, or partially modified products thereof.

The xylene resins are those products obtained by reaction of xylene with compounds having an aldehyde group, such as formaldehyde, with or without modification with phenol, alkylphenols or amines.

The resin composition having the above constituents should preferably be soluble in organic solvents. The organic solvents for this purpose include alicyclic compounds such as cyclohexane, aromatic compounds such as xylene, toluene, benzene and the like, ketones such as acetone, methyl ethyl ketone and the like. These solvents may be used singly or in combination. These solvents should be properly used depending upon the type of resin composition used.

The resin composition should preferably comprise a polymer having a functional group or groups reactive with an isocyanate group and a blocked isocyanate in a stoichiometric equivalent ratio with respect to the functional groups and the isocyanate groups. If a non-reactive polymer is used, this polymer is used in an amount of from 5 to 20 wt % of the resin composition. Moreover, when a thermosetting resin or oligomer having a rather poor film forming property but having a functional group or groups, care should be taken so that the total functional groups of the film-forming polymer and the thermosetting resin are substantially at a stoichiometric equivalent ratio to the total isocyanate groups used. The amount of the thermosetting resin or oligomer may depend upon a desired degree of mechanical strength of a final magnet and is not critical.

The mixture of the fine pieces of the melt-quenched Fe-B-R alloy and the resin composition is provided as composite granules or particles. The granules or particles of the mixture can be obtained by applying a resin composition dissolved in an organic solvent directly or via a surface coating of the individual pieces of the Fe-B-R alloy used and drying them under agitation. The granules should be controlled as having a size not larger than 400 micrometers, by which a bridging phenomenon, as would occur in a hopper when formed into green compacts, can be suitably prevented because of the good flowability of the granules. On the other hand, too small a size is not favorable. At least 50 wt % of the granules should preferably have a size not smaller than 75 micrometers because of ease in formation of a final resin-bonded magnet of a desired form. The apparent density of the granules should preferably be in the range of from 2.0 to 3.0 g/cm$^3$, within which the resultant resin-bonded magnet is ensured to have uniform magnetic characteristics throughout the magnet. The content of the resin composition in the granules is preferably in the range of from 1.0 to 3.0 wt %. Within this range, a final resin-bonded magnet is readily fabricated without greatly influencing the magnetic performance of the magnet.

The granules are subsequently subjected to compression molding to form a green compact of a ring, column, cylinder or the like. This compression operation is efficiently carried out by a constant metering-by-volume/given compression ratio procedure in which a predetermined volume of the granules is measured and charged into a cavity of a predetermined capacity and compressed at a predetermined ratio of 1.8 to 3:1 so that the resultant green compact has a density of 5.3 to 6.0 g/cm$^3$.

The thus obtained green compact is finally thermally treated without permitting the compact to be expanded. To this end, the compact is heated in a mold for inhibiting the expansion of the compact at least along the outer surface thereof. The heating temperature is sufficient to allow thermal dissociation of a compound used for the stabilization of the isocyanate groups and to soften or melt the resin composition and is usually in the range of from 140° to 200° C. although the temperature may vary depending upon the types of isocyanate, stabilizing compound and resin. The heating time depends upon the size of green compact and may be from 2 to 20 minutes in most cases. As a result, blocking groups of the blocked isocyanate are dissociated to provide a free isocyanate which subsequently reacts with the functional groups of the polymer and/or the thermosetting resin defined before, thereby bonding the flaky pieces strongly. Thus, the final resin-bonded magnet has a very highly accurate dimension and high strength sufficient for a magnet.

The resin-bonded magnet obtained according to the method of the invention, in which a green compact is formed from composite granules of fine pieces of a melt-quenched Fe-B-R and 3 wt % of a resin composition and is thermally treated to obtain a resin-bonded magnet having a density of 5.5 g/cm$^3$, reaches a maximum energy product of about 7.3 MGOe. This magnetic property is ensured irrespective of the shape and the direction of the magnet. This value of the maximum energy product is better than or at least equal to those of a rare earth element-cobalt alloy sintered magnet of a ring or cylindrical form and a rare earth element-cobalt alloy resin-bonded magnet of a similar form. In addition, the fabrication of the resin-bonded magnet according to the invention is more efficient and thus, the method of the invention is better in balance of economy and performance.

The present invention is more particularly described by way of examples.

EXAMPLE 1

This example illustrates melt-quenched Fe-B-R alloys used in ensuing examples.

Alloys having an atomic composition of $Fe_{81}B_6Nd_{13}$ which had been melted in a high-frequency melting furnace in an atmosphere of Ar were each continuously dropped between rolls through an orifice to obtain melt-quenched ribbons having different thicknesses of from 10 to 30 micrometers. The respective ribbons were suitably broken into pieces. In Table 1, there are shown atomic compositions of the melt-quenched Fe-B-Nd in terms of $Nd_{1-x}(Fe_{1-y}, B_y)_x$ along with impurity elements and a thickness.

TABLE 1

| Sample No. | Atomic Composition | Impurity Elements | Thickness (micro-meters) |
|---|---|---|---|
| M-1 | $Nd_{0.134}(Fe_{0.933}, B_{0.067})_{0.866}$ | Pd, Al, Si | 9-11 |
| M-2 | $Nd_{0.136}(Fe_{0.932}, B_{0.068})_{0.864}$ | Mo, Pd, | 15-18 |
| M-3 | $Nd_{0.134}(Fe_{0.931}, B_{0.069})_{0.866}$ | Zr, Pd, | 20-25 |
| M-4 | $Nd_{0.140}(Fe_{0.930}, B_{0.070})_{0.860}$ | V, Pr | 25-30 |
| M-5 | $Nd_{0.143}(Fe_{0.943}, B_{0.057})_{0.860}$ | Pr | 25-30 |

EXAMPLE 2

This example describes resin compositions.

A polyether resin was heated to 100° C. for dissolution in a mixed solvent of cyclohexane and xylene in a four-necked flask equipped with a thermometer, a condenser, a resin charge port and an agitator, and allowed to stand at room temperature. Thereafter, a solution in cyclohexane and xylene (7:3) of a blocked isocyanate of an adduct of 3 moles of tolylene diisocyanate and 1 mole of trimethylolpropane stabilized with methanol was added to the polyether resin solution so that the amount of the blocked isocyanate was 20 parts by weight per 100 parts by weight of the polyether resin. Subsequently, a mixed solvent of cyclohexane and xylene (7:3) was added so as to make a total concentration of 30%, followed by sufficient agitation to obtain a resin composition solution R-1.

Similarly, a polyvinyl butyral resin was dispersed in cyclohexane at room temperature and dissolved by heating to about 60° C., followed by allowing it to stand at room temperatures. Subsequently, a solution in cyclohexane and xylene (7:3) of a blocked isocyanate of an adduct of 3 moles of tolylene diisocyanate and 1 mole of trimethylolpropane stabilized with methyl cellosolve was added to the polyvinyl butyral solution so that the content of the blocked isocyanate was 20 parts by weight per 100 parts by weight of the polyvinyl butyral resin, followed by addition of cyclohexane to make a total concentration of 10% and sufficient mixing, thereby obtaining a resin composition solution R-2.

Moreover, a polyether resin and a polysulfone resin were added to N,N'-dimethylformamide at a mixing ratio by parts by weight of 30:70 and heated to about 100° C. for dissolution to make a concentration of 25%, followed by allowing to stand at room temperature. 4,4'-Diphenylmethane diisocyanate stabilized with methyl cellosolve and solidified from a mixed solvent of cyclohexane and xylene was dissolved in cresol. This solution was added to the resin solution so that the content of the blocked isocyanate was 15 parts by weight per 100 parts by weight of the total resin, followed by controlling the total concentration at 20% and sufficient mixing to obtain a resin composition solution R-3.

EXAMPLE 3

This examples describes composite granules.

The melt-quenched Fe-B-Nd pieces M-1, M-2, M-3, M-4 and M-5 obtained in Example 1 were, respectively, charged into a mixer equipped with a thermometer, a reducing valve, a spray gun for the resin composition solution and an agitator. While agitating, the resin composition solutions R-1, R-2 and R-3 were, respectively, sprayed over the individual pieces and heated at about 60° C. under agitation, followed by reducing the pressure to not higher than 20 mmHg to remove the solvent, thereby obtaining composite granules. The content of the resin composition in the composite granules was controlled to be in the range of from 1.0 to 3.0 wt %. The resultant granules were placed in a ball mill for size control. That is, the size was controlled in the range of from 30 to 400 micrometers.

Reference is now made to the accompanying drawings and particularly to FIGS. 1*a* through 1*d* showing a green compact molding machine used in the following example. In the figure, there is generally shown a molding machine M which comprises a hopper 1 and a die 2. The die 2 has a lower punch 3 and a center or float core 4. The lower punch 3 is designed to move vertically. Indicated at 5 is an upper punch, at 6 are composite granules in the hopper 1, and at 7 is a cavity accomodating the composite granules 6. A final green compact obtained by compression is indicated by 8.

In operation, when the die 2 is moved upward along with the center core 4 by the action of a float core unit 10 from the state of FIG. 1*a* by a suitable means (not shown), the cavity 7 is formed between the die 2 and the center core 4 and defined by the lower punch 3 with an open end 9. At the same time, the hopper 1 is slided in position so as to allow the granules 6 in the hopper 1 to naturally drop into the cavity 7.

Figure 1C:
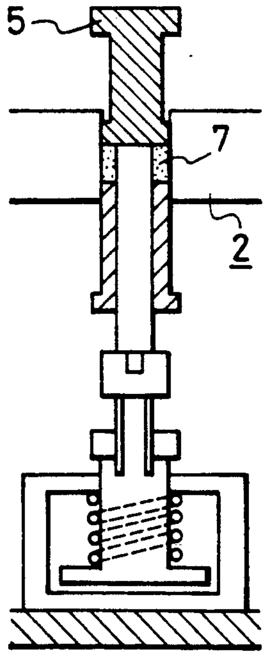
Figure 1D:
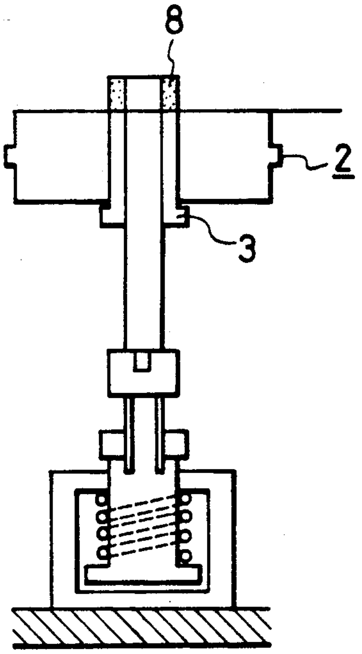

When the cavity is filled with the granules, the hopper 1 is removed and the upper punch 5 descends for compression as shown in FIG. 1*c*. After completion of the compression, the die 2 moves downward to obtain the green compact 8.

The above procedure is repeated to convert the composite granules into green compacts.

The green compact is thermally treated while restricting the outer surface of the compact without permitting the expansion of the green compact. The thermal treatment should be effected at a temperature sufficient to soften or melt the resin composition in the green compact and to thermally dissociate the compound used for stabilization of isocyanate groups. The temperature is in the range of from 140° to 200° C. as defined before.

The pieces of Fe-B-R alloys are magentically isotropic and it is not necessary to apply a magnetic field when a green compact is shaped. Accordingly, composite granules should favorably have good powder flowability so as not to cause a bridging phenomenon in the hopper.

EXAMPLE 4

The composite granules obtained in Example 3 using M-1 and R-1 at a mixing ratio by weight of 97:3 were subjected to classification of the size. The granules of the respective size ranges were subjected to measurement of a flowability and an apparent density determined according to the methods prescribed in JIS Z-2502 and JIS Z-2504, respectively. The results are shown in Table 2.

TABLE 2

| Size (μm) | 53-75 | 75-106 | 106-150 | 150-250 | 250-400 | 400- |
|---|---|---|---|---|---|---|
| Apparent Density ($g/cm^3$) | 2.38 | 2.35 | 2.30 | 2.18 | 2.14 | 2.08 |

TABLE 2-continued

| Size ($\mu$m) | 53-75 | 75-106 | 106-150 | 150-250 | 250-400 | 400- |
|---|---|---|---|---|---|---|
| Flowability (second/50 g) | bridging | 46 | 49 | 53 | 70 | bridging |

As will become apparent from Table 2, when the size of the composite granules are over 400 micrometers and below 75 micrometers, a bridging phenomenon may take place with a loss of the flowability. As a matter of course, for the industrial production of a resin-bonded magnet, a vibration means may be used to promote the flow of composite granules. However, the vibration is not always favorable because classification of the granules is inevitably invited. Anyway, good flowability is attained when granules, having a size not larger than 75 micrometers, are not contained in amounts of larger than 50 wt % of the total granules.

Moreover, studies were made on composite granules using M-1 and R-1 in which the composition of R-1 was varied with respect to an NCO/OH ratio of from 0.4 to 1.0, the concentration of R-1 in the granules was varied from 1.0 to 3.0 wt %, and the heating time for the R-1-applied granules was from 2 to 20 minutes. The influences of the above factors on qualities of a final resin-bonded magnet such as a dimensional accuracy of a resin-bonded magnet based on the size of a mold used, a density of the resultant resin-bonded magnet, and a total magnetic flux after decapolar magnetization on an outer surface were determined based on the design of experiments using the Latin square. The resin-bonded magnet used was in the form of a hollow cylinder having an outer diameter of 8 mm, an inner diameter of 5.5 mm and a length of 4.6 mm.

The results are shown in Tables 3, 4 and 5.

TABLE 3

| NCO/OH Wt % | Dimensional Accuracy | | | |
|---|---|---|---|---|
| | $A_1$(0.4) | $A_2$(0.6) | $A_3$(0.8) | $A_4$(1.0) |
| $B_1$(3.0) | $C_2$ 0.61 | $C_4$ 0.61 | $C_1$ 0.53 | $C_3$ 0.52 |
| $B_2$(2.0) | $C_1$ 0.60 | $C_2$ 0.57 | $C_3$ 0.58 | $C_4$ 0.47 |
| $B_3$(1.5) | $C_4$ 0.74 | $C_3$ 0.40 | $C_2$ 0.42 | $C_1$ 0.57 |
| $B_4$(1.0) | $C_3$ 0.64 | $C_1$ 0.55 | $C_4$ 0.61 | $C_2$ 0.60 |

$C_{1-4}$ = 200° C. × 2-20 minutes
Fo(A) = 1.87, F(3, 6; 0.05) = 4.76
Fo(B) = 0.48, Fo(C) = 0.88
The unit of the measurements is expressed by percent.

TABLE 4

| NCO/OH Wt % | Density of Magnet | | | |
|---|---|---|---|---|
| | $A_1$(0.4) | $A_2$(0.6) | $A_3$(0.8) | $A_4$(1.0) |
| $B_1$(3.0) | $C_2$ 5.33 | $C_4$ 5.29 | $C_1$ 5.40 | $C_3$ 5.39 |
| $B_2$(2.0) | $C_1$ 5.39 | $C_2$ 5.38 | $C_3$ 5.33 | $C_4$ 5.40 |
| $B_3$(1.5) | $C_4$ 5.36 | $C_3$ 5.41 | $C_2$ 5.50 | $C_1$ 5.38 |
| $B_4$(1.0) | $C_3$ 5.38 | $C_1$ 5.41 | $C_4$ 5.40 | $C_2$ 5.44 |

$C_{1-4}$ = 200° C. × 2-20 minutes
Fo(A) = 0.81, F(3, 6; 0.05) = 4.76
Fo(B) = 1.44, Fo(C) = 0.86
The unit is expressed by g/cm$^3$.

TABLE 5

| NCO/OH Wt % | Total Magnetic Flux | | | |
|---|---|---|---|---|
| | $A_1$(0.4) | $A_2$(0.6) | $A_3$(0.8) | $A_4$(1.0) |
| $B_1$(3.0) | $C_2$ 3500 | $C_4$ 3500 | $C_1$ 3500 | $C_3$ 3500 |
| $B_2$(2.0) | $C_1$ 3500 | $C_2$ 3500 | $C_3$ 3500 | $C_4$ 3500 |
| $B_3$(1.5) | $C_4$ 3500 | $C_3$ 3500 | $C_2$ 3500 | $C_1$ 3500 |
| $B_4$(1.0) | $C_3$ 3500 | $C_1$ 3500 | $C_4$ 3500 | $C_2$ 3500 |

$C_{1-4}$ = 200° C. × 2-20 minutes
The unit is expressed by maxwell.

As will be apparent from the results of Tables 3 to 5, the cylindrical resin-bonded magnets of the invention are very stable in quality in relation to the variation in fabrication conditions.

EXAMPLE 5

Figure 2:
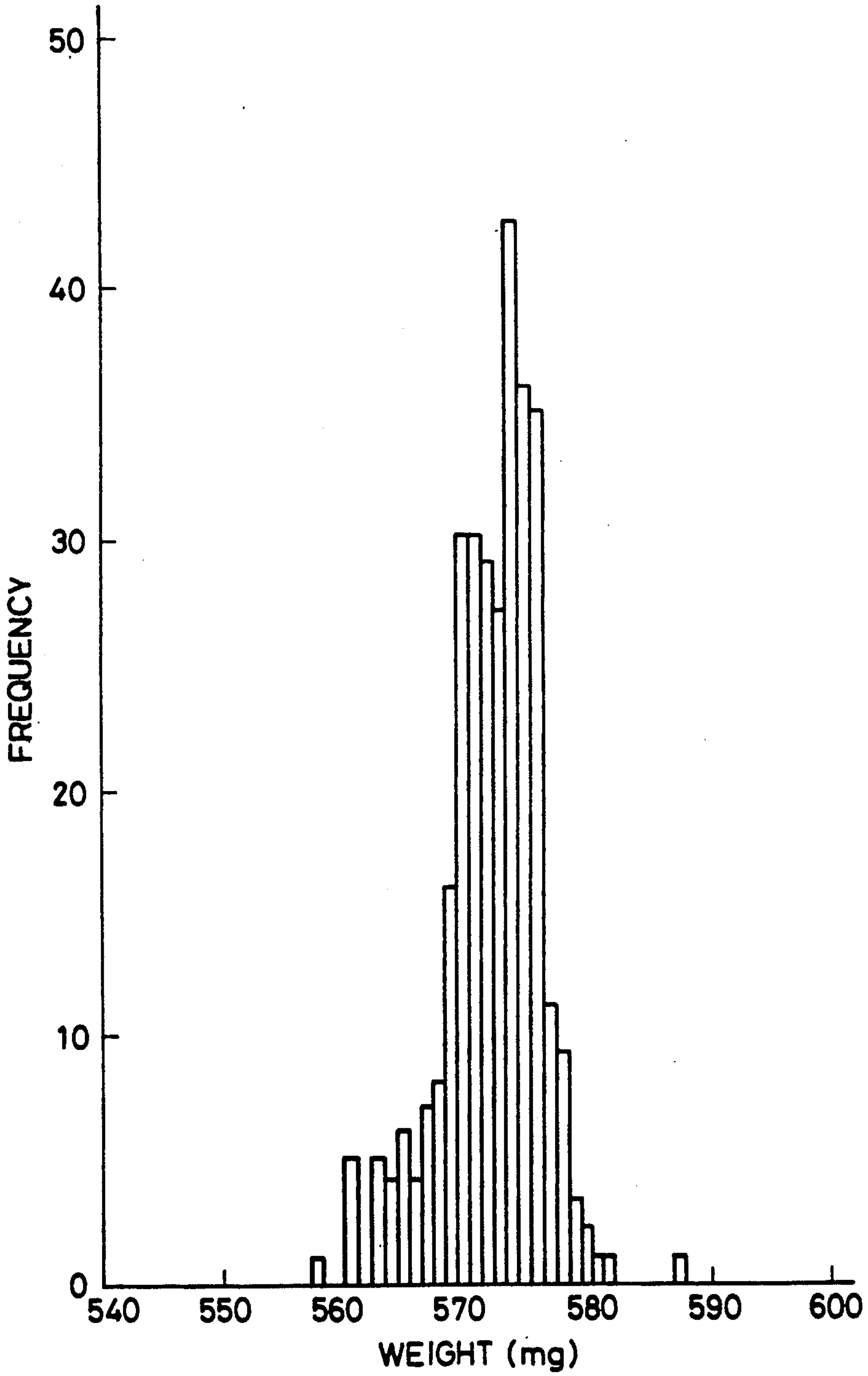
FIG. 2 is a histogram showing a metering-by-volume accuracy of composite granules of ferromagnetic pieces and a resin composition.
Figure 3A:
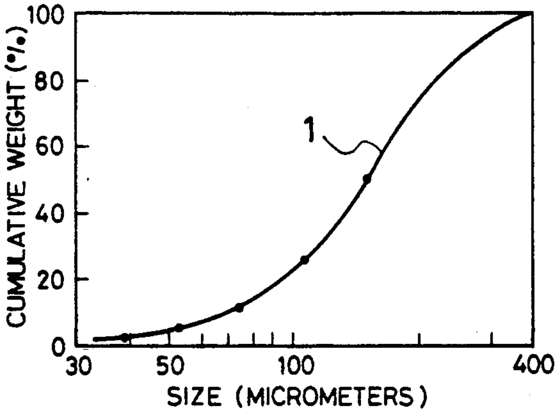
FIGS. 3*a* and 3*b* are, respectively, a graphical representation of a cumulative weight in relation to the variation in particle size for different samples.

Composite granules of M-1 and R-1 in a mixing ratio by weight of 97:3 was formed into a green compact according to the molding machine of the type shown in FIG. 1 in order to determine an accuracy of volumetric metering. The cavity of the molding machine had an outer diameter of 8 mm and an inner diameter of 5.5 mm. The results are shown in FIG. 2. Further, the size distribution of the composite granules is shown in FIG. 3*a*. The apparent density was 2.7 g/cm$^3$. The molding cycle of the green compact was 25 shots/minutes.

FIG. 2 reveals that the metering accuracy is very high with a 95% confidence limit of 571 mg plus or minus 11 mg.

Figure 3B:
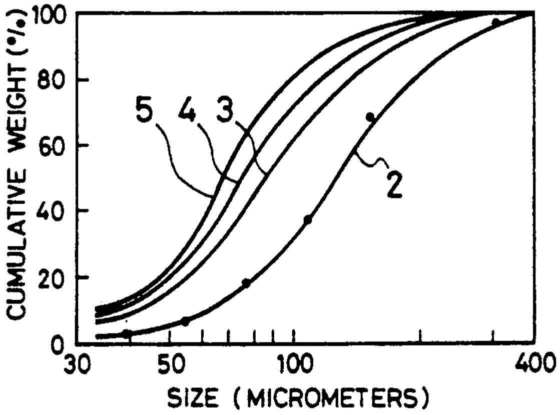

When the size of composite granules becomes smaller as in curves 2, 3, 4 and 5 of FIG. 3*b*, the accuracy in the metering gradually lowers. As with curves 4 and 5 of FIG. 3*b*, the content of granules having a size not larger than 75 micrometers exceeds 50 wt %, not only the metering accuracy becomes relatively poor, but also continuous fabrication of green compacts becomes difficult owing to the bridging and classification phenomena.

Figure 4:
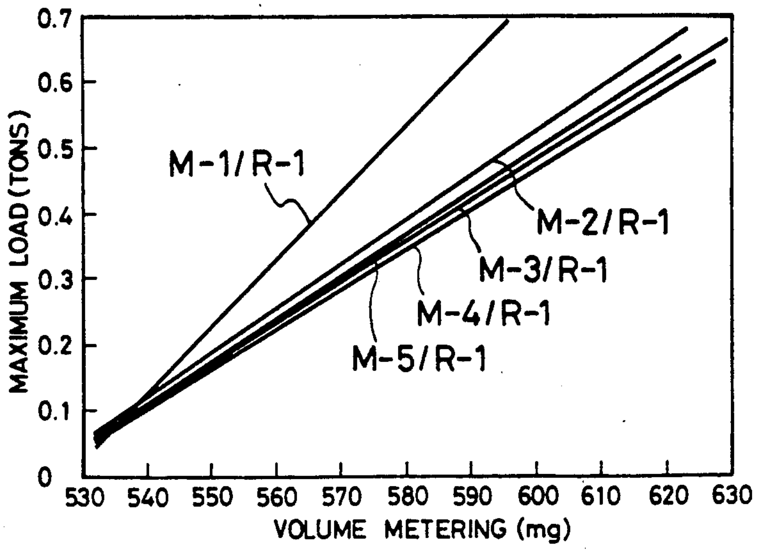
FIG. 4 is a graphical representation of a maximum load at a given compression ratio in relation to the variation in volume metering.

FIG. 4 shows the relation between a weight as measured by volumetric metering and a maximum load at the time of compression to a given extent when composite granules of M-1, M-2, M-3, M-4 or M-5 and R-1 are formed into green compacts by the molding machine as shown in FIG. 1. For instance, the coefficient of correlation, $\gamma$, for M-1/R-1 granules is $\gamma=0.810>\gamma_o$ (102; 0.01)=0.258. With M-2/R-1 granules, $\gamma=0.885>\gamma_o$ (30; 0.01)=0.449. Thus, regression lines are obtained for the respective granules. The difference in size distribution of the composite granules is within 3%, which is influenced by the thickness of the flaky pieces of the melt-quenched Fe-B-R alloys. Especially, in the case of M-1 pieces having a thickness of about 10 micrometers as shown in Table 1, an excess compression pressure is required when a green compact is fabricated at the same compression ratio, thus giving an adverse influence on the mold. Hence, the thickness of the flaky pieces is preferably 15 micrometers or larger.

EXAMPLE 6

The green compacts obtained with respect to Example 5 were thermally treated at a temperature of 200° C. in an expansion-inhibiting mold for restricting the outer surface of the green compact to obtain a cylindrical resin-bonded magnet.

As a result, it was found that the expansion of the green compacts by the thermal treatment could be substantially completely suppressed using the mold in such a way that at a 95% confidence limit, the outer diameter was within plus and minus 3 micrometers, the height was within plus and minus 5 micrometers, the weight was within plus and minus 11 mg and the density was within plus and minus 0.1 g/cm$^3$. The expansion-inhibiting mold was particularly effective in making a thin wall resin-bonded magnet. The reason for this is considered as follows: when a green compact is thermally treated, not only the green compact itself is thermally expanded, but also an expansion pressure produced by thermal dissociation of a compound used for stabilizing a blocked isocyanate in the resin composition and also by separation of the compound from the green compact develops. Accordingly, if any mold intimately accomodating a green compact is not used, the green compact will be readily deformed during the thermal treatment. It will be noted that a clearance between a green compact and an expansion-inhibiting mold may be approximately 0.03 mm.

EXAMPLE 7

Composite granules of M-1 and R-1 at a mixing ratio by weight of 97:3 were compressed and thermally treated to obtain a cylindrical resin-bonded magnet having a density of 5.5 g/cm$^3$.

For comparison, bisphenol A having a weight-average molecular weight of 1200 and epichlorohydrin were reacted to obtain a solid epoxy resin. This epoxy resin alone was used instead of the polyether to make a cylindrical resin-bonded magnet of particles of M-1. The magnet had a density of 5.5 g/cm$^3$.

These magnets were subjected to microphotography at the outer surface thereof. The microphotographs of 300 magnifications are shown in FIGS. 5*a* and 5*b* for the magnets of the invention and for comparison, respectively.

Figure 5A:
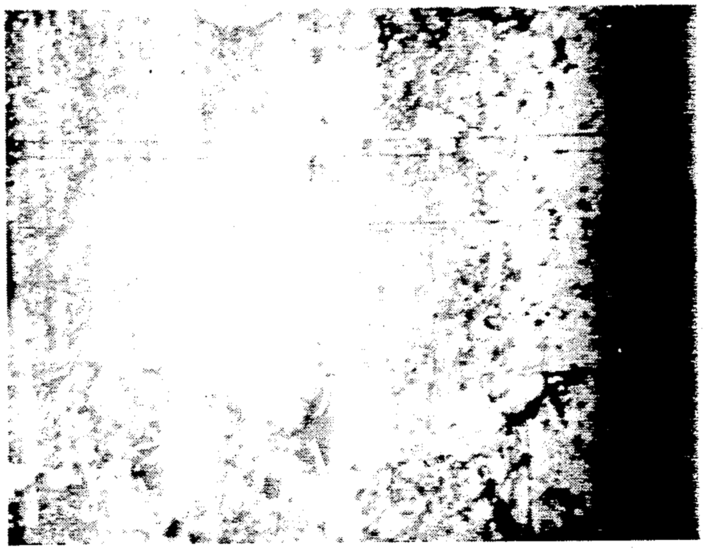
FIGS. 5*a* and 5*b* are, respectively, microphotographs of resin-bonded ring magnets of the invention and for comparison with respect to a grain structure on an outer surface of the respective magnets.
Figure 5B:

As will be clear from the comparison between the microphotographs of FIGS. 5*a* and 5*b*, the magnet (a) of the invention is covered with the resin composition film without exposure of the melt-quenched alloy pieces as in (b) on the outer surface of the magnet. This is very advantageous in that when the magnet is used under high humidity conditions, the film can prevent corrosion.

Moreover, the magnets used above were, respectively, allowed to stand under conditions of 40° C. and 96.5% for 300 hours and subsequently subjected to microphotography at 1000 magnifications.

Figure 6A:
FIGS. 6*a* and 6*b* are, respectively, microphotographs of resin-bonded magnets of the invention and for comparison after allowing to stand under high humidity conditions with respect to a grain structure on an outer surface of the respective magnets.
Figure 6B:
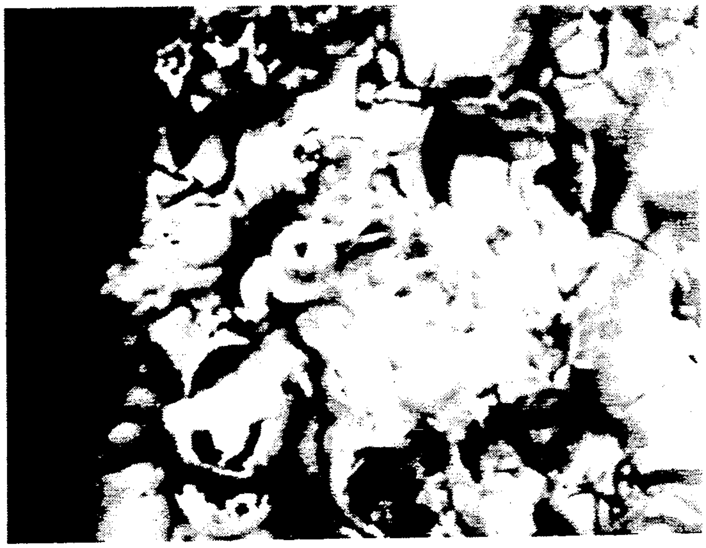

The microphotographs are shown in FIGS. 6*a* and 6*b* corresponding to FIGS. 5*a* and 5*b*, respectively. The magnet of the present invention is not corroded at all, but the magnet for comparison is corroded.

Similarly, when cylindrical resin-bonded magnets having a density of 5.5/cm$^3$ were made using M-1/R-2, and M-1/R-3 each at a mixing ratio by weight of 97/3 and allowed to stand under high humidity conditions as used above, no corrosion was observed on the surface of the respective magnets.

EXAMPLE 8

The general procedure of Example 7 was repeated using M-1 and R-1, thereby obtaining a cylindrical resin-bonded magnet having an outer diameter of 8 mm, an inner diameter of 5.5 mm and a height of 4.1 mm. This magnet was subjected to decapolar magnetization around the outer surface thereof. The distribution of a magnetic flux on the surface is shown in FIG. 7*a*.

For comparison, a mixture of particles, with a size of 10 to 90 micrometers, of $Sm(Co_{0.668}Cu_{0.101}Fe_{0.214}Zr_{0.017})_{7.33}$ and a liquid epoxy resin at a mixing ratio by weight of 97:3 was compression molded, without formation of composite granules, in a magnetic field along the radial direction to obtain a cylindrical resin-bonded magnet having a density of 6.8 g/cm$^3$ with the same size as the magnet of the invention. This magnet was similarly magnetized decapolarly. The distribution of the surface magnetic flux is shown in FIG. 7*b*.

Figure 7A:
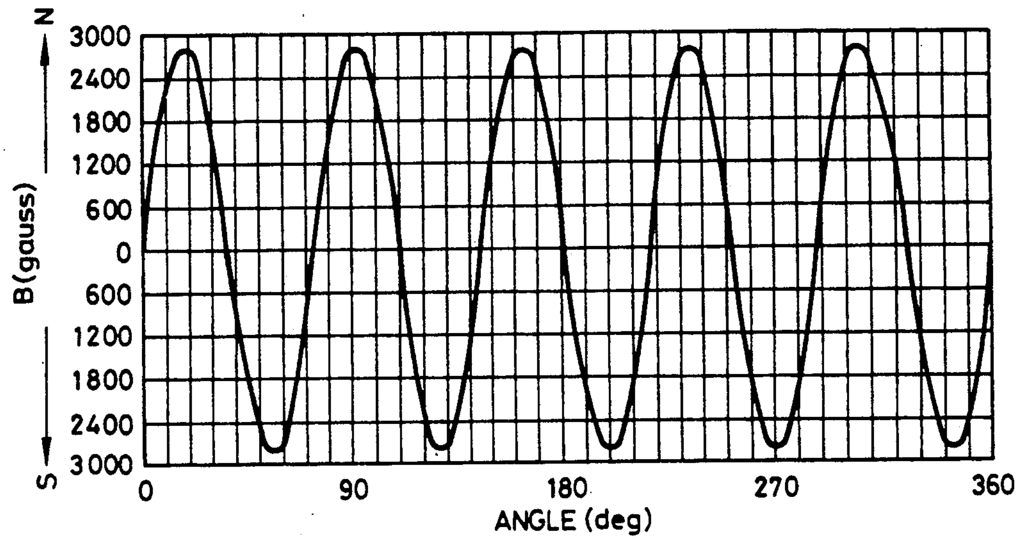
FIGS. 7*a* and 7*b* are, respectively, characteristic curves of resin-bonded ring magnets of the invention and for comparison after multi-polar magnetization with respect to the distribution of a magnetic flux density on the surface of the respective magnets.
Figure 7B:
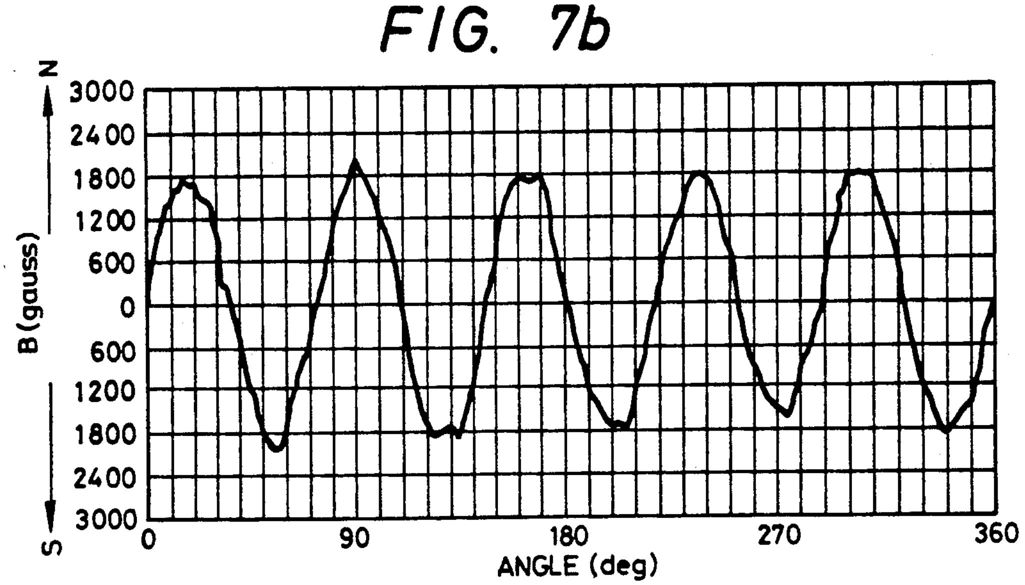

The comparison between FIGS. 7*a* and 7*b* reveals that the distribution of FIG. 7*a* is more uniform with higher maximum values. Presumably, this is because the magnet of the invention can be fabricated in a non-magnetic field before magnetization and in a high dimensional accuracy. On the contrary, the rare earth element/cobalt magnet for comparison is compression molded in the magnetic field along the radial direction and is subsequently in a demagnetized state. In addition, composite granules are not used in this case, so that the green compact cannot be formed in a high dimensional accuracy. Moreover, the degree of magnetic anisotropy of the magnet of the invention is not influenced by the dimension and shape of the magnet and also by the direction of magnetization. However, with the rare earth element/cobalt resin-bonded magnet for comparison, the degree of magnetic anisotropy is considerably influenced by the dimension and shape of the magnet and the direction of magnetization.

As will be apparent from the foregoing, the method of the invention places little limitation on the dimension and shape of a final magnet and the direction of magnetization. Since flaky pieces of melt-quenched Fe-B-R alloys are used, a maximum compression load for molding a green compact is relatively low when the compression is effected at a given compression ratio. This is effective in reduction of a damage of a mold and also in making a resin-bonded magnet having a uniform distribution of density. The use of a blocked isocyanate can prolong a storage life of composite granules and ensures a rapid thermal treatment of a green compact.

What is claimed is:

1. A method for making a resin-bonded magnet which comprises providing composite granules obtained from a mixture of magnetically isotropic, fine pieces of a melt-quenched Fe-B-R intermetallic compound or alloy, in which R is at least one element selected from Nd and Pr, and a resin composition comprising at least one film-forming polymer having a functional group reactive with an isocyanate group and a blocked isocyanate, wherein said composite granules are formed by dissolving or dispersing a resin composition in a solvent and the resultant solution or dispersion is applied to said magnetically isotropic, fine pieces of the melt-quenched Fe-B-R intermetallic compound or alloy, said composite granules comprising from 1 to 3 weight percent of the resin composition, compressing the composite granules to obtain a green compact of a desired form, and heating the green compact at temperatures sufficient to soften or melt the resin composition and to allow reaction between the at least one film-forming polymer and an isocyanate formed by dissociation of blocking groups of the blocked isocyanate, thereby obtaining a resin-bonded magnet.

2. A method according to claim 1, wherein the pieces have a thickness not smaller than 15 micrometers.

3. A method according to claim 1, wherein said resin composition further comprises at least one polymer which is not reactive with isocyanate groups.

4. A method according to claim 1, wherein said resin composition further comprises a thermosetting resin or oligomer having a functional group reactive with the isocyanate.

5. A method according to claim 1, wherein said granules have a size not larger than 400 micrometers.

6. A method according to claim 1, wherein at least 50 wt % of said granules have a size not smaller than 75 micrometers.

7. A method according to claim 1, wherein said granules have an apparent density of from 2.0 to 3.0 g/cm$^3$.

8. A method according to claim 1, wherein a predetermined amount of said granules are charged into a cavity for molding and compressed at a predetermined compression ratio of 1.8 to 3.0:1, thereby obtaining the green compact having a density of from 5.3 to 6.0 g/cm$^3$.

9. A method according to claim 1, wherein said green compact is thermally treated in a mold for inhibiting the thermal expansion of said green compact.

10. A method according to claim 9, wherein the thermal treatment is effected at a temperature of from 140° to 200° C.

11. A method according to claim 1, wherein the composite granules are obtained by continuously forming a melt of the alloy into a quenched ribbon, breaking the ribbon into flaky pieces, and mixing the pieces with the resin composition.

12. A method according to claim 11, wherein the composite granules obtained by the mixing are classified to have a controlled size.

* * * * *